United States Patent Office

3,526,515
Patented Sept. 1, 1970

3,526,515
METHOD OF WATERPROOFING BAKED GOODS
Sanford Werbin, Dumont, N.J., and Irving H. Rubenstein, Stevenson, and David Weinstein, Baltimore, Md., assignors to Maryland Cup Corporation, Owings Mills, Md.
No Drawing. Filed Dec. 21, 1966, Ser. No. 603,436
Int. Cl. A21d 13/00
U.S. Cl. 99—86                                                    8 Claims

ABSTRACT OF THE DISCLOSURE

Crisp baked products, such as ice cream cones, cookies and biscuits are rendered moisture repellent by coating with animal or vegetable oil, natural or hydrogenated, which contains an admixture of a small amount of a higher melting solid fat, such as a stearine or a palmitin which seeds the coating so that it solidifies before soaking into the baked goods.

BACKGROUND OF THE INVENTION

The present invention is concerned with the improvement of the water repellency of crisp types of baked goods, relatively low in moisture content, which may be exposed to a moisture atmosphere or which may be in contact with another food material of wet character, such as fillings, icings, ice cream, sherbet, frozen custard, and the like. The invention is particularly concerned with imparting water resistance and water repellency to edible containers, such as ice cream cones and cups. It will be understood, however, that the practice of the invention is applicable to all types of crisp, relatively low moisture content, baked goods.

Baked goods represent the product of the baking of a mixture of flour, shortening, sugar, leavening agents, flavoring materials, and optionally the components of eggs. By reason of transformations wrought by the baking process, such as, for example, the gelatinization of starch present, baked products are usually susceptible to the influence of moisture, and tend to become soggy and distasteful when wetted. This is a matter of particular concern in the case of crisp types of baked products, such as ice cream cones and cups, cookies and biscuits, which possess a relatively low moisture content, ranging between about 2% to 10% by weight. It is less of a problem in the case of baked goods of relatively high moisture content, such as bread and cake which are ordinarily soft. For example, the moisture content of bread ranges between 30% and 50%, while that of cake lies in the range of 20% to 35%.

Methods for maintaining the crispness of ice cream cones and the like which have been proposed in the prior art include spraying the baked cone, immediately after baking, with a vegetable oil, so as to saturate the cone material, and to impart resistance to the penetration of moisture. Because a coating treatment of this type has proved unable to withstand the thrust of the ice crystals in the frozen filling of ice cream, it has been further proposed to apply a two-stage coating treatment in which a first coat of a fat melting between 70° and 80° F. is applied by spraying in liquid state, followed by applying a second similar coat cover the first coat to act as a barrier layer. A method of this type is disclosed in U.S. Pat. 3,186,852. Another method which is widely used to impart moisture resistance is to incorporate additional hydrophobic material, such as shortening, in the batter from which the baked goods are made, and a method of this kind is described in U.S. Pat. 2,688,551. All the waterproofing materials of the type described employed in the prior art have possessed relatively low melting points, below about 125° F., so that either an excessively thick total coating was required to achieve acceptable moisture repellency, or the amount in the final cone or cup imparted a noticeable off-taste.

SUMMARY OF THE INVENTION

In accordance with the present invention, there is provided a novel coating composition and method for its application to crisp types of baked goods having a relatively low moisture content, for which only a single coating is ordinarily needed, although a multiplicity of coats may be applied, if desired. The coating composition of the invention comprises a mixture of a vegetable or animal oil, natural or hydrogenated, with a small proportion of a solid fat comprising primarily stearins and palmitins in the melting point range of about 120° to 160° F.

It has been found, in accordance with the invention, that the addition of this relatively high meling point solid fat serves to seed the vegetable or animal oil type coating so that it solidifies prior to soaking into the baked goods. This seeding causes the coating to crystallize more rapidly and to form a comparatively moisture-impervious film on the surface of the baked goods. The resulting fatty film, being continuous and homogeneous, provides an effective barrier to moisture penetration and wetting. It imparts to the baked goods a degree of moisture protection far exceeding that obtainable by conventionally applied fatty materials, such as oils and shortenings with the omission of the solid fat. The degree of moisture absorption of baked goods treated with the coating composition of the invention is proportional to the thickness of the coating, but owing to the greater effectiveness of the coating material, relatively thin coatings will provide adequate protection to the baked goods.

DESCRIPTION OF THE PREFERRED EMBODIMENTS

The major component of the coating compositions is an animal or vegetable oil or fat, natural or hydrogenated, of the edible types conventionally employed in baking, including shortening, lard, butter, coconut oil, cottonseed oil, soybean oil, palm oil, corn oil, peanut oil, and the like, or mixtures thereof. These materials have melting points below about 125° F. Thus, there is commonly employed coconut oil having a melting point at about 76° F.

The high melting point fat additive is employed in the proportion of between about 5% and about 15% by weight of the total major oil or fat component or shortening. The solid fat comprises a stearin or a palmitin, or a mixture thereof. The melting point range of the solid fat additive is critical and lies in the range of about 120° and about 160° F.

The stearin may be a triglyceride of stearic acid, or a commercial grade thereof containing a small percentage of the diglyceride of stearin. The palmitin may be a triglyceride of palmitic acid or a commercial grade thereof containing a small percentage of the diglyceride of palmitic acid. The solid fat may comprise mixtures of both types of stearins and palmitins in any proportions, providing the mixture falls within the melting temperature range stated previously. The stearin and/or palmitin employed in accordance with the invention is to be distinguished from the monostearin and monopalmitin which are incorporated as emulsifiers into a baking mix prior to baking of breads and cakes, as described in U.S. Pat. 2,871,124, which do not involve a moisture control problem.

There may also be incorporated into the coating compositions of the invention, various flavoring and coloring materials, such as skim milk powder, cocoa powder and chocolate. Dispersing agents, such as, for example, lecithin or polyoxyethylene sorbitan monostearate (Tween 60) or Span 60 (a fatty acid ester of anhydrous sorbitol) may also be included.

The shortening component of the composition and the solid fat additive are admixed in any suitable type of apparatus until a homogeneous mixture is obtained. It is applied to the baked goods by immersion, spraying, or other conventional means. The seeding action can be observed visually in that the fat or oil becomes cloudy and then sets.

The superior moisture repellency properties of baked goods coated with the compositions of the invention are demonstrated by comparative tests of an uncoated ice cream cone, and of cones coated with conventional prior art compositions, and with various formulations in accordance with the invention. The testing technique involves immersing a cone in the formulation which has first been heated to 150° F., then cooling to 130° F. Alternatively, the cones may be filled with the formulation, allowed to stand for 10 seconds, discarding the residues left in the cone, inverting the cones and allowing them to drain free. Results are substantially identical by both methods.

The cones are set aside to cool for 24 hours, after which they are placed in an upright position in a ring stand over an empty beaker. Six cones of each formulation tested were filled with water, placed in the ring stands, and observed until the water had penetrated the cone and begun to seep through the outside surface and to drain down the outside wall of the cone.

An uncoated cone withstood moisture penetration for 5 minutes. A cone coated with 76° F. coconut oil, containing 5% cocoa and 5% dry milk, withstood water penetration for 10 minutes. Double coating the cone with this formulation extended the time to only 15 minutes.

In contrast thereto, the following examples show formulations made by the practice of the invention, and their greatly enhanced resistance to moisture. These examples are to be considered as illustrative and not as limiting:

EXAMPLE 1

| | Parts by wt. |
|---|---|
| Shortening, melting point 110°–116° F. | 102 |
| Stearin, melting point 138°–143° F. | 22 |
| Span 60 emulsifier | 1.5 |
| Cocoa powder | 5 |

Time before moisture penetration: 100 minutes.

EXAMPLE 2

| | Parts by wt. |
|---|---|
| Shortening, melting point 110°–116° F. | 82 |
| Hydrogenated fat, melting point 118° F. (Aratex) | 30 |
| Stearin, melting point 138°–143° F. (Duratex) | 12 |
| Lecithin | 0.7 |
| Cocoa | 5 |

Time before moisture penetration: 90 minutes.

EXAMPLE 3

| | Parts by wt. |
|---|---|
| Shortening, melting point 110°–116° F. | 82 |
| Hydrogenated fat, melting point 118° F. (Aratex) | 20 |
| Stearin, melting point 138°–143° F. (Duratex) | 22 |
| Span 60 emulsifier | 1.5 |
| Cocoa | 5 |

Time before moisture penetration: 105 minutes.

EXAMPLE 4

| | Parts by wt. |
|---|---|
| Coconut oil, 110° F. | 180 |
| Hydrogenated fat, melting point 118° F. | 45 |
| Stearin, melting point 138°–143° F. | 24 |
| Skim milk powder | 20 |
| Lecithin | 1.5 |

Time before moisture penetration: 90 minutes.

It will be understood that the above description of the present invention is susceptible to various modifications, changes, and adaptations, and the same are intended to be comprehended within the meaning and range of equivalents of the appended claims.

What is claimed is:

1. Method for rendering baked goods repellent to moisture comprising applying to the surface of the baked goods a homogeneous mixture of a seedable edible fat or oil in liquid form and which will not of itself solidify upon cooling prior to penetrating the surface of the baked goods and a sufficient proportion of a solid fat having a melting point in the range of about 120° to 160° F. to seed said seedable fat or oil so that it solidifies on cooling prior to penetrating the surface, and then cooling the mixture so that it solidifies forming a coating on the surface of the baked goods without substantial penetration thereof.

2. The method as defined in claim 1 wherein the solid fat is primarily a tristearin.

3. The method as defined in claim 1 wherein the solid fat is primarily a tripalmitin.

4. The method as defined in claim 1 wherein the solid fat is primarily a mixture of a tristearin and a tripalmitin.

5. The method as defined in claim 1 wherein the baked goods are ice cream cones.

6. The method as defined in claim 1 wherein the proportion of solid fat to shortening material is between about 5% and about 14% by weight of said seedable fat or oil.

7. The method as defined in claim 1 wherein the shortening material is selected from the group consisting of a vegetable oil, an animal oil, an animal fat, and hydrogenated products thereof.

8. The method as defined in claim 1 wherein the baked goods are crisp type baked goods having a moisture content between about 2% and about 10% by weight.

References Cited

UNITED STATES PATENTS

| 1,529,670 | 3/1925 | Pritchard et al. | 99—88 |
| 1,708,252 | 4/1929 | Berch | 99—88 XR |
| 3,186,852 | 6/1965 | Baker | 99—89 XR |
| 2,442,532 | 6/1948 | Eckey | 99—118 XR |
| 2,521,219 | 9/1950 | Holman et al. | 99—118 |

LIONEL M. SHAPIRO, Primary Examiner

J. R. HOFFMAN, Assistant Examiner

U.S. Cl. X.R.

99—89, 166